(12) United States Patent
Carsello (10) Patent No.: US 6,317,474 B1
(45) Date of Patent: Nov. 13, 2001

(54) METHOD AND APPARATUS FOR ESTIMATING TIME-OF-ARRIVAL OF A SYNCHRONIZATION SIGNAL SENT SIMULTANEOUSLY FROM AT LEAST TWO NON-COLLOCATED TRANSMITTERS

(75) Inventor: Stephen Rocco Carsello, Fort Worth, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/130,174

(22) Filed: Aug. 6, 1998

(51) Int. Cl.[7] ....................... H04L 7/00
(52) U.S. Cl. ............... 375/354; 342/357; 342/387
(58) Field of Search ............... 375/354; 342/47, 342/387, 357; 455/456; 370/548, 18

(56) References Cited

U.S. PATENT DOCUMENTS

| | | | |
|---|---|---|---|
| 5,220,584 | | 6/1993 | Burns . |
| 5,266,953 | * | 11/1993 | Kelly et al. ............... 342/47 |
| 5,548,583 | * | 8/1996 | Bustamante ............... 370/18 |
| 5,596,330 | * | 1/1997 | Yokev et al. ............... 342/387 |
| 5,629,708 | * | 5/1997 | Rodal et al. ............... 342/357 |
| 5,652,772 | * | 7/1997 | Isaksson et al. ............... 375/367 |
| 5,883,598 | * | 3/1999 | Parl et al. ............... 342/457 |
| 5,890,068 | * | 3/1999 | Fattouche et al. ............... 455/456 |
| 6,031,490 | * | 2/2000 | Forssen et al. ............... 342/457 |
| 6,084,886 | * | 7/2000 | Dehner et al. ............... 370/458 |

* cited by examiner

Primary Examiner—Stephen Chin
Assistant Examiner—Tony Al-Beshrawi
(74) Attorney, Agent, or Firm—R. Louis Breeden (57) ABSTRACT

At least two non-collocated transmitters (116) transmit (1604) a synchronization signal such that it includes at least three predetermined tone frequencies. A receiver (122) receives (1606) the synchronization signal, and separates (1608) the synchronization signal into a plurality of segments (404). The receiver then calculates (1610) segment Fourier transform values corresponding to the at least three predetermined tone frequencies, for ones of the plurality of segments, thereby creating a set of segment Fourier transform values. The receiver also computes a set of segment time-of-arrival (TOA) values corresponding to the set of segment Fourier transform values. In addition, the receiver determines (1612) a set of segment weights from the set of segment Fourier transform values, and estimates (1616) the TOA of the synchronization signal from the set of segment TOA values and the set of segment weights.

11 Claims, 8 Drawing Sheets

METHOD AND APPARATUS FOR ESTIMATING TIME-OF-ARRIVAL OF A SYNCHRONIZATION SIGNAL SENT SIMULTANEOUSLY FROM AT LEAST TWO NON-COLLOCATED TRANSMITTERS

FIELD OF THE INVENTION

This invention relates in general to wireless communication systems, and more specifically to a method and apparatus for estimating a time-of-arrival of a synchronization signal sent simultaneously from at least two non-collocated transmitters.

BACKGROUND OF THE INVENTION

Modern simulcast messaging systems are evolving towards ever increasing data rates to accommodate increasing messaging traffic. A promising solution for obtaining higher data rates is the use of quadrature amplitude modulation (QAM) techniques. In a system employing QAM, synchronization is a key determinant of system performance.

Simulcast systems pose unique challenges, in that multiple signals arrive at a messaging receiver with time-of-arrival offsets. It is the job of the synchronization system to properly synchronize the receiver in the presence of such distortion. Prior-art synchronization techniques are unable to estimate the time-of-arrival of synchronization signals accurately enough for desired QAM performance in a simulcast environment.

Thus, what is needed is a new, more accurate method and apparatus for estimating a time-of-arrival of a synchronization signal in a simulcast environment.

SUMMARY OF THE INVENTION

An aspect of the present invention is a method in a wireless communication system for estimating a time-of-arrival (TOA) of a synchronization signal sent simultaneously from at least two non-collocated transmitters. The method comprises, in the at least two non-collocated transmitters, the step of transmitting the synchronization signal such that it includes at least three predetermined tone frequencies. The method further comprises, in a receiver, the steps of receiving the synchronization signal, and separating the synchronization signal into a plurality of segments. The method further comprises the steps of calculating segment Fourier transform values corresponding to the at least three predetermined tone frequencies, for ones of the plurality of segments, thereby creating a set of segment Fourier transform values; and computing a set of segment TOA values corresponding to the set of segment Fourier transform values. The method further comprises the steps of determining a set of segment weights from the set of segment Fourier transform values, and estimating the TOA of the synchronization signal from the set of segment TOA values and the set of segment weights.

Another aspect of the present invention is a receiver in a wireless communication system for estimating a time-of-arrival (TOA) of a synchronization signal including at least three predetermined tone frequencies sent simultaneously from at least two non-collocated transmitters. The receiver comprises a receiver element for receiving the synchronization signal, and a processing system coupled to the receiver element for processing the synchronization signal. The processing system is programmed to separate the synchronization signal into a plurality of segments, and to calculate segment Fourier transform values corresponding to the at least three predetermined tone frequencies, for ones of the plurality of segments, thereby creating a set of segment Fourier transform values. The processing system is further programmed to compute a set of segment TOA values corresponding to the set of segment Fourier transform values, and to determine a set of segment weights from the set of segment Fourier transform values. In addition, the processing system is programmed to estimate the TOA of the synchronization signal from the set of segment TOA values and the set of segment weights.

Another aspect of the present invention is a controller in a wireless communication system for facilitating estimation of a time-of-arrival (TOA) of a synchronization signal by a receiver. The controller comprises a network interface for receiving a message from a message originator, and a processing system for processing the message. The controller further comprises a transmitter interface coupled to the processing system for controlling at least two transmitters to transmit the message. The processing system is programmed to control the at least two transmitters to simultaneously transmit, prior to sending the message, the synchronization signal such that it includes at least three predetermined tone frequencies; and to rely upon the receiver to estimate the TOA of the synchronization signal so that the receiver can decode the message.

DETAILED DESCRIPTION OF THE DRAWINGS

Figure 1:
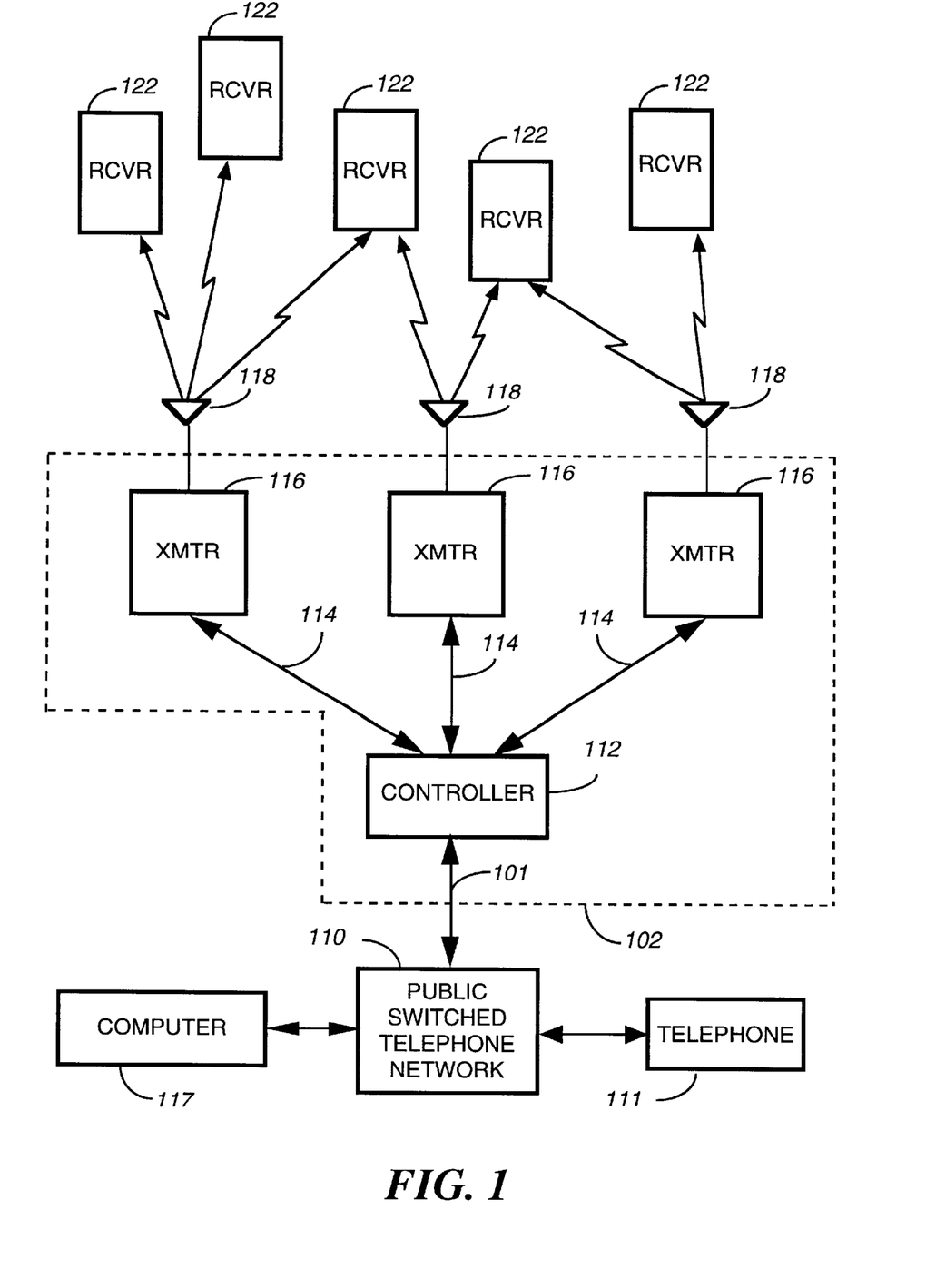
FIG. 1 is an electrical block diagram of an exemplary wireless communication system in accordance with the present invention.

FIG. 1 is an electrical block diagram of an exemplary wireless communication system in accordance with the present invention, comprising a fixed portion 102 including a controller 112 and a plurality of non-collocated transmitters 116, the wireless communication system also including a plurality of receivers 122. The transmitters 116 preferably communicate with the receivers 122 utilizing conventional radio frequency (RF) techniques, and are coupled by communication links 114 to the controller 112, which controls the transmitters 116. Receivers 122 that are within range of two or more of the transmitters 116 can receive simulcast transmissions therefrom for added transmission reliability.

The hardware of the controller 112 is preferably a combination of the Wireless Messaging Gateway (WMG™) Administrator! paging terminal, and the RF-Conductor!™ message distributor manufactured by Motorola, Inc., and includes software modified in accordance with the present invention. The hardware of the transmitters 116 is preferably similar to the RF-Orchestra! transmitter and can include, in two-way wireless communication systems, the RF-Audience!™ receiver manufactured by Motorola, Inc. The receivers 122 are preferably similar to the PageWriter™ wireless communication units, also manufactured by Motorola, Inc., and have hardware and software modified in accordance with the present invention, as described further below. It will be appreciated that other similar hardware can be utilized as well for the controller 112, the transmitters 116, and the receivers 122.

Each of the transmitters 116 transmits RF signals to the receivers 122 via an antenna 118. The RF signals transmitted by the transmitters 116 to the receivers 122 (outbound messages) comprise selective call addresses identifying the receivers 122, and data messages originated by a caller, as well as commands originated by the controller 112 for adjusting operating parameters of the wireless communication system.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 or a conventional computer 117 coupled to the PSTN 110. It will be appreciated that, alternatively, other types of communication networks, e.g., packet switched networks, the Internet, and local area networks, can be utilized as well for transporting originated messages to the controller 112.

The over-the-air protocol utilized for the transmissions is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. It will be further appreciated that, while one embodiment for practicing the present invention is a one-way wireless communication system, the present invention is applicable also to a two-way wireless communication system.

Figure 2:
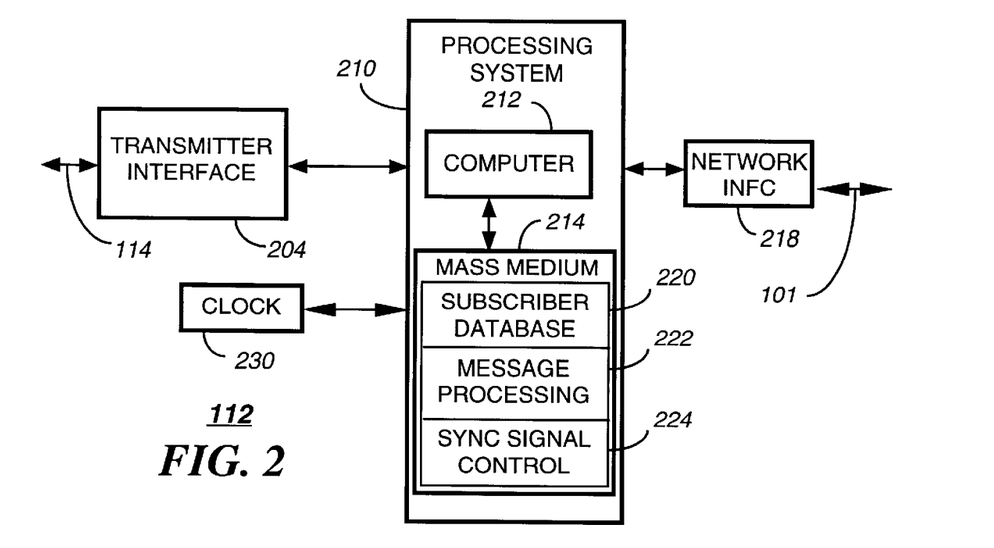
FIG. 2 is an electrical block diagram of an exemplary controller in accordance with the present invention.

FIG. 2 is an electrical block diagram depicting an exemplary controller 112 in accordance with the present invention. The controller 112 comprises a conventional network interface 218 for receiving a message from a message originator via the telephone links 101. The network interface 218 is coupled to a processing system 210 for controlling and communicating with the network interface 218. The processing system 210 is coupled to a conventional transmitter interface 204 for controlling and communicating with the transmitters 116 via the communication links 114. The processing system 210 is also coupled to a conventional clock 230 for providing a timing signal to the processing system 210. The processing system 210 comprises a conventional computer 212 and a conventional mass medium 214, e.g., a magnetic disk drive, programmed with information and operating software in accordance with the present invention. The mass medium 214 comprises a subscriber database 220, including information about the receivers 122 controlled by the controller 112. The mass medium 214 also includes a message processing element 222 for programming the processing system 210 to process messages for the receivers 122 through well-known techniques. The processing system 210 also includes a synchronization signal control program 224 for programming the processing system to generate and control a synchronization signal in accordance with the present invention, as described further below.

Figure 3:
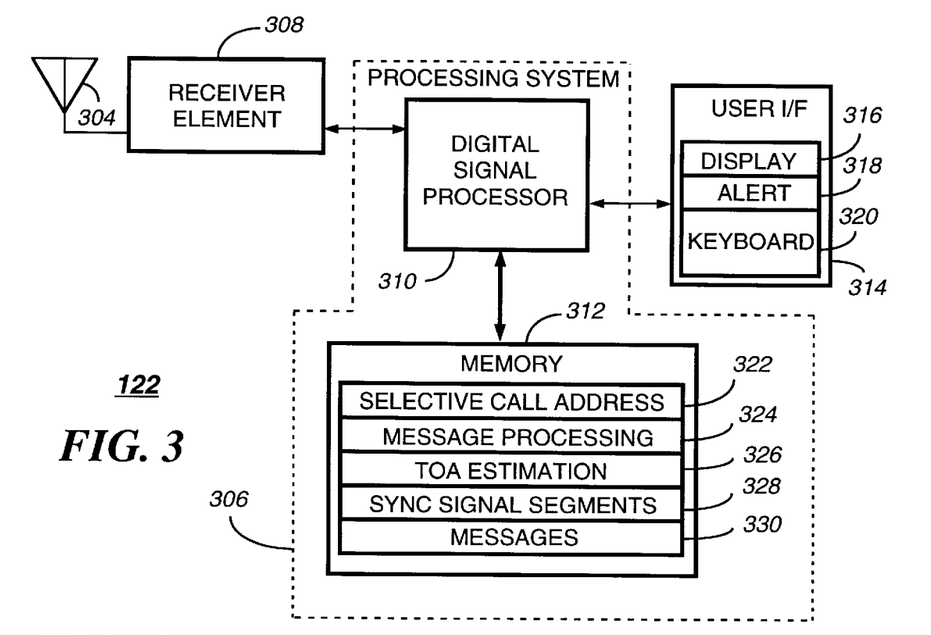
FIG. 3 is an electrical block diagram of an exemplary receiver in accordance with the present invention.

FIG. 3 is an electrical block diagram of an exemplary receiver 122 in accordance with the present invention. The receiver 122 comprises an antenna 304 for intercepting an outbound message and (optionally, in two-way systems) for transmitting an inbound message to a base receiver (not shown). The antenna 304 is coupled to a conventional receiver element 308 for receiving the outbound message and (optionally) can be coupled to a conventional transmitter (not shown) for transmitting an inbound message. The receiver element 308 is coupled to a processing system 306 for processing the messages and for controlling the receiver 122. A user interface 314 preferably is also coupled to the processing system 306 for providing an interface with a user. The user interface 314 preferably comprises a conventional display 316 for displaying messages, a conventional alert element 318 for alerting the user when a message arrives, and a conventional keyboard 320 for controlling the receiver 122. It will be appreciated that some models of the receiver 122, e.g., receivers for controlling a device, can replace the user interface 314 with a conventional device interface (not shown). The processing system 306 preferably comprises a conventional digital signal processor (DSP) 310 and a conventional memory 312. In the preferred embodiment, the DSP is a model DSP56800, manufactured by Motorola, Inc. of Schaumburg, Ill., and executes software readily written by one of ordinary skill in the art, given the teachings of the instant disclosure. It will be appreciated that, alternatively, other similar DSPs can be substituted for the DSP56800. It will be further appreciated that, alternatively, some or all of the processing system 306 can be realized in hardware instead of through software programming of the DSP and, in addition, that the memory 312 can be made integral to the DSP 310.

The memory 312 comprises software elements and other variables for programming the processing system 306 in accordance with the present invention. The memory 312 preferably includes a selective call address 322 to which the receiver 122 is responsive. In addition, the memory 312 includes a message processing element 324 for programming the processing system 306 to process messages through well-known techniques. The memory 312 also includes a time-of-arrival (TOA) estimation program 326 for programming the processing system 306 to estimate the TOA of a received synchronization signal, in accordance with the present invention. In addition, the memory 312 includes space for storing synchronization signal segments 328 and messages 330.

Figure 4:
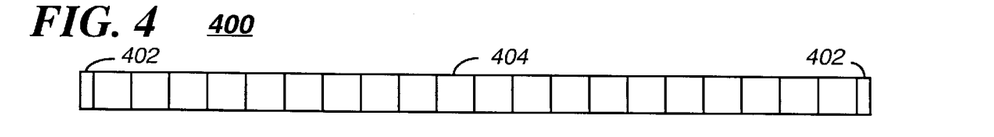
FIG. 4 is an exemplary segmentation diagram in accordance with the present invention.

FIG. 4 is an exemplary segmentation diagram 400 in accordance with the present invention. The diagram 400 represents a synchronization signal having a first predetermined length, e.g., 85 msec. The synchronization signal preferably is separated by the processing system 306 into a plurality of, e.g., 20, segments 404 having a second predetermined length, e.g., 4 msec., for processing. Separating the synchronization signal into segments for processing advantageously provides a time diversity improvement to the TOA estimation, because "bad" segments, e.g., those corresponding to a time when the received signal is of poor quality, can be reduced in weight, or eliminated entirely, as described further below. Beginning and end portions 402, each of a predetermined length, e.g., 2.5 msec, of the synchronization signal are not processed to provide a margin for timing errors.

Now begins a more detailed description of the theory behind, and two embodiments in accordance with, the present invention. Consider a synchronization signal made up of a plurality of tones, with the transmitted waveform taking the form $$s(t) = \sum_i e^{j(\omega_i t + \phi_i)} \quad 0 \le t \le T,$$

where $\{\omega_i\}$ is a set of tone frequencies known a priori to the receiver 122, and T is the duration of the segment 404 being processed. At time t=0, each tone assumes a phase in the set $\{\phi_i\}$, also known a priori to the receiver 122. For a flat fading channel, the received signal may be represented as $$r(t) = A(t)e^{j\theta(t)}e^{j\omega_e t}\sum_i e^{j[\omega_i(t-t_0)+\phi_i]} + n(t),$$

where $A(t)e^{j\theta(t)}$ is the channel fading function, and n(t) is additive white Gaussian noise. To synchronize with the synchronization signal, the receiver 122 estimates and corrects for the frequency error $\omega_e$, using well-known techniques, and then determines the time-of-arrival (TOA) $t_0$ in accordance with the present invention.

For TOA estimation, let us first give some background on dual-tone TOA estimation-a prior-art technique designed for flat fading channels. Assuming the fading is very slow, the received signal can be written as $$r(t) = Ae^{j\theta_0}\{e^{j[2\pi f_1(t-t_0)+\phi_1]} + e^{j[2\pi f_2(t-t_0)+\phi_2]}\} + n(t) \quad 0 \le t \le T$$

where the frequencies, $f_1$ and $f_2$, and starting phases, $\phi_1$ and $\phi_2$, are assumed to be known at the receiver. In an attempt to estimate the time $t_O$ of arrival, the prior-art receiver first estimates the phases of the two tones at their respective frequencies using the Fourier transform.

Neglecting noise, the receiver computes the phasors $$R_1 = \int_0^T r(t)e^{-j2\pi f_1 t}dt = Ae^{j\theta_0}e^{j(\phi_1 - 2\pi f_1 t_0)}$$

-continued $$R_2 = \int_0^T r(t)e^{-j2\pi f_2 t}dt = Ae^{j\theta_0}e^{j(\phi_2 - 2\pi f_2 t_0)},$$

where we assume orthogonality between the tones, i.e., $f_2 - f_1 = k/T$, where k is a non-zero integer.

The TOA estimate is computed by the receiver according to $$\hat{t}_0 = \frac{\angle R_1 R_2^* e^{j(\phi_2 - \phi_1)}}{2\pi(f_2 - f_1)} = t_0.$$

The phase computation covers the range $[-\pi,\pi]$, so the TOA estimate is only valid provided that $$-\frac{1}{2|f_2 - f_1|} \le t_0 \le \frac{1}{2|f_2 - f_1|}.$$

We will now illustrate the problem associated with this approach in a simulcast environment. Assume a dual-tone synchronization signal with frequencies ±1000 Hz. Also assume a two-path simulcast channel with differential delay $\tau$, differential phase $\Delta\theta$, and differential power $\Delta P$ (expressed in dB). The two phasors are easily shown to be $$R_1 = 1 + 10^{\Delta P/20}e^{j(\Delta\theta - 2\pi f_1 \tau)},$$

$$R_2 = 1 + 10^{\Delta P/20}e^{j(\Delta\theta - 2\pi f_2 \tau)}.$$

Figure 5:
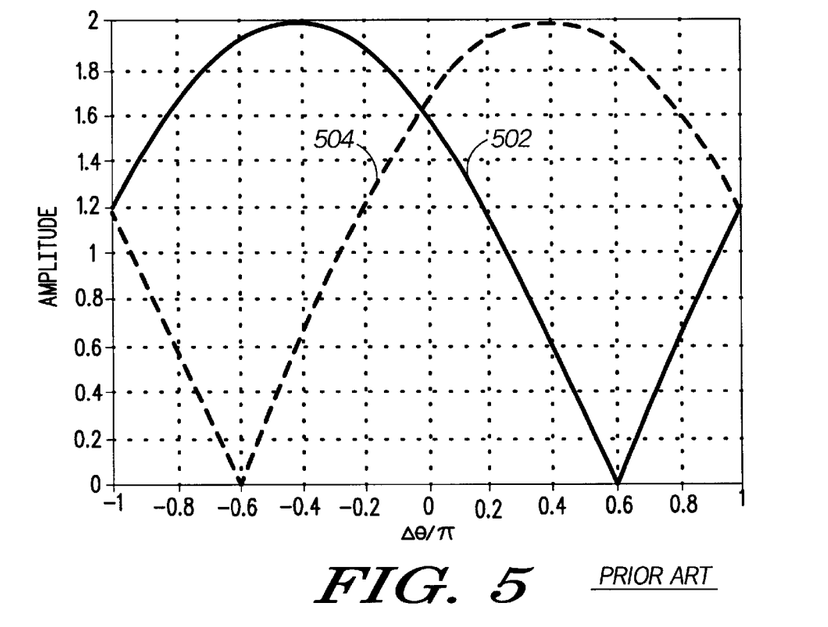
FIG. 5 is an exemplary diagram depicting phasor amplitude versus channel differential phase of a prior-art two-tone synchronization technique.
Figure 6:
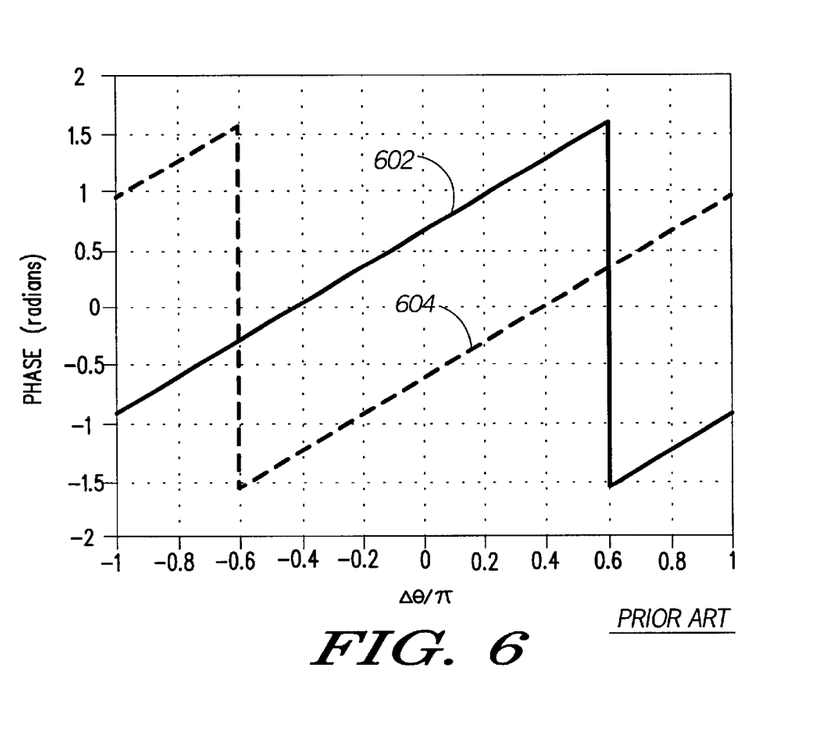
FIG. 6 is an exemplary diagram depicting phasor phase versus channel differential phase of the prior-art two-tone synchronization technique.
Figure 7:
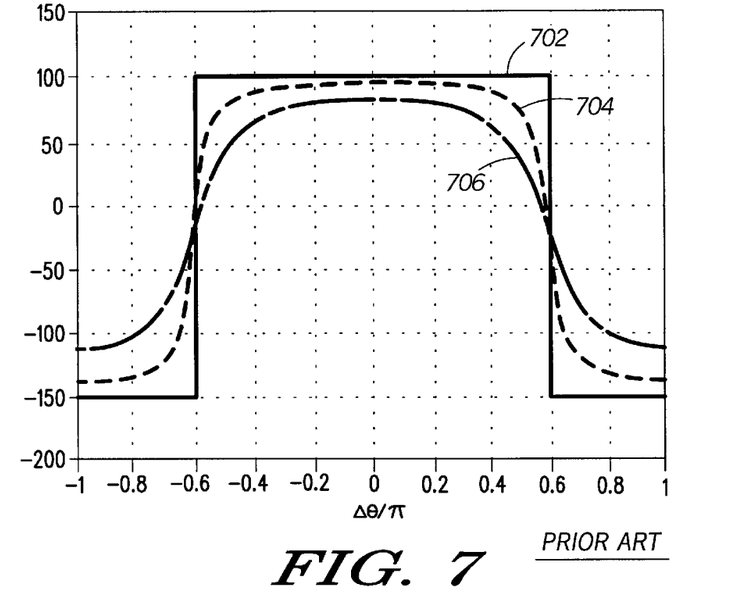
FIG. 7 is an exemplary diagram depicting time-of-arrival (TOA) estimation versus channel differential phase of the prior-art two-tone synchronization technique.

Note that the two instantaneous amplitudes will differ, i.e., the fading is not flat, but frequency-selective. FIG. 5 shows the amplitudes 502, 504 of $R_1$ and $R_2$, respectively, versus $\Delta\theta$ for $\tau$=200 μsec. Note that nulls occur at $\Delta\theta = \pm 0.6\pi$. FIG. 6 shows the phases 602, 604 of $R_1$ and $R_2$, respectively, which exhibit 360 degree phase shifts where the amplitude nulls occur. This confuses the prior-art TOA estimator, as shown in FIG. 7 for different $\Delta P$s of 0 dB 702, 1 dB 704, and 3 dB 706. Observe that the TOA estimates become very erroneous when $|\Delta\theta|>0.6\pi$. (With the example 200 μsec differential delay between the two signals, the "correct" TOA estimate is 100 μsec, or "right in the middle" of the individual signal TOAS.) The range of phases producing the erroneous TOAs begins where the channel frequency response exhibits a null in between our two tones. We therefore need a way to detect that a channel null has landed in band, and to appropriately suppress the bad TOA estimates.

Our solution is to use more than 2 tones. In a first embodiment in accordance with the present invention, let's extend the dual-tone synchronization signal to have a third tone at 0 Hz. Let the TOA weight for segment m be given by $$W_{t,m} = \min_i\{|R_m[N+k_i+k_0 \bmod N]|^2\}, \tag{1}$$

where $R_m(k)$ is the length-N FFT of the mth segment (DC corresponds to k=0), $k_i$ is the ith tone frequency index, and $k_0$ is the bin offset. Instead of summing the tone powers, the weight is computed as the minimum of the tone powers. Now, we have three tones, so three chances to detect a low tone. This increases our chances of detecting an in-band channel null compared to the prior-art dual-tone case. Given the set of TOA estimates $$\{\hat{t}_m\},$$

calculated as described further below, and weights $\{W_{t,m}\}$, the TOA for the entire synchronization signal is computed as $$\hat{t}_0 = \frac{\sum_m w_{t,m} \hat{t}_m}{\sum_m w_{t,m}}.$$

Figure 8:
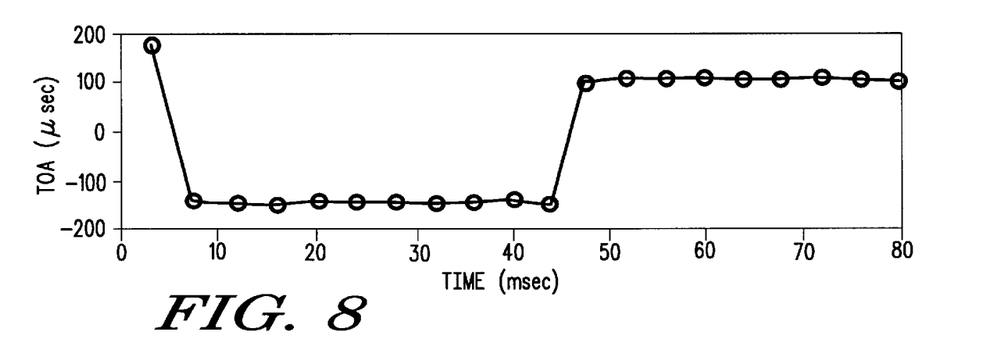
FIG. 8 is an exemplary diagram depicting simulcast performance of a first embodiment of a TOA estimator in accordance with the present invention.
Figure 9:
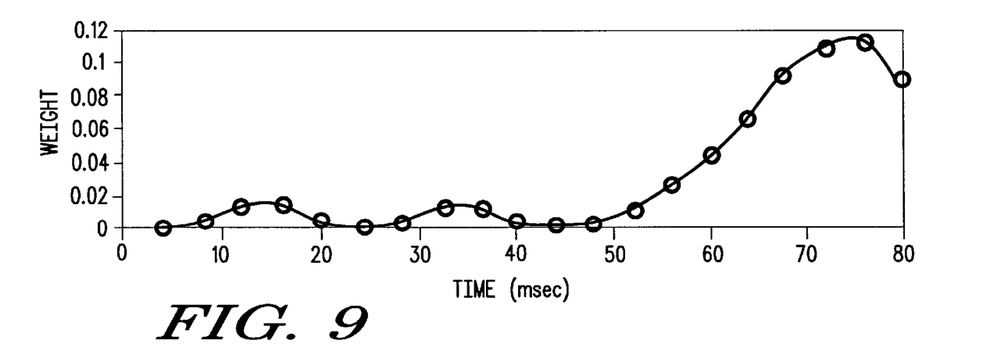
FIG. 9 is an exemplary diagram depicting weights computed by the first embodiment of a TOA estimator in accordance with the present invention.
Figure 10:
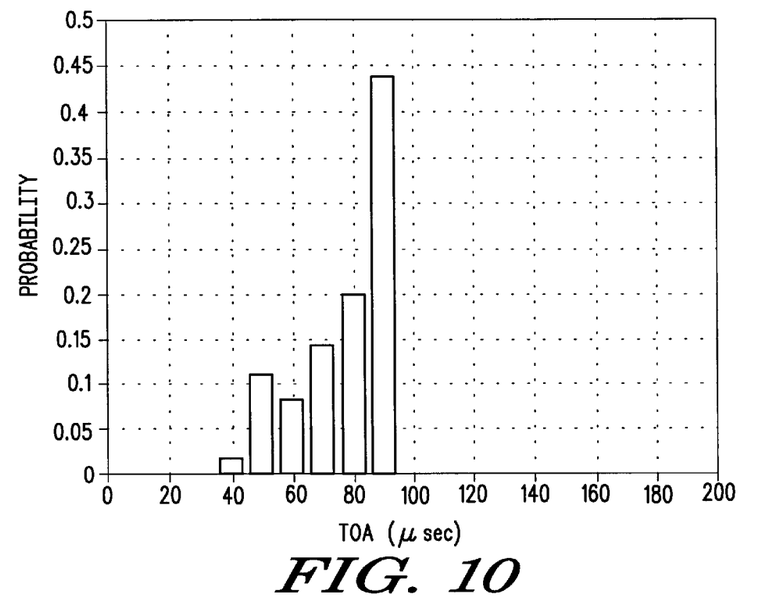
FIG. 10 is an exemplary diagram depicting a TOA probability distribution achieved by the first embodiment of a TOA estimator in accordance with the present invention.

This weighting technique helps mitigate the simulcast problem, but does not solve it completely. FIG. 8 illustrates the simulcast performance of the TOA estimation of the first embodiment using the 3-tone synchronization signal under the conditions of equal power and 203.125 μsec differential delay for an example 80 msec synchronization signal processing interval and a 10 Hz transmitter frequency offset. FIG. 9 shows the weights computed over the example 80 msec synchronization signal processing interval. Note that, as the transmitter offset sweeps the Δθ, the TOAs go from very bad to very good. However, the weights do not adequately suppress the bad TOAs, as shown in FIG. 10. The optimum TOA is 101.5625 μsec (one half the differential delay). Note that these measurements are badly skewed with a high variance.

It should be pointed out that the synchronization signal needs to be long enough in duration so that the transmitter carrier frequency offsets have enough time to traverse through at least one-half of a cycle. This will ensure that the receiver 122 is not in a signal null for a significant portion of the duration of the synchronization signal. If, for example, the smallest transmitter offset is 10 Hz, then the synchronization signal needs to be at least 50 msec long.

Figure 11:
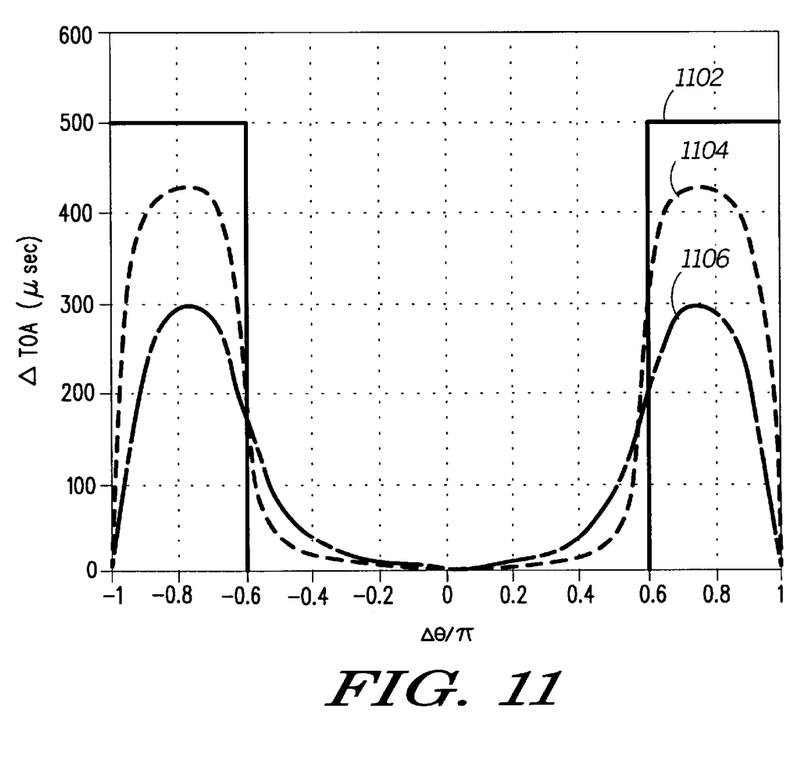
FIG. 11 is an exemplary diagram depicting a TOA quality metric versus channel differential phase.

The solution presented here in a second embodiment in accordance with the present invention is to modify the weights of the TOA estimates when bad conditions are detected. Define the metric $$\Delta TOA = \max_i(\hat{t}_i) - \min_i(\hat{t}_i),$$

which represents the "swing" of the TOA estimates measured over all tone-pairs indexed by i. The idea is that, when the channel is good, all of the tone pairs should produce similar TOA estimates. When the channel goes bad, a large disparity among the estimates occurs. This concept is captured in FIG. 11, which depicts three ΔTOA curves 1102, 1104, 1106 for ΔP of 0, 1, and 3 dB, respectively, versus the channel Δθ, based on the analytical model. Observe that, as ΔP is increased, the metric becomes very small at Δθ=π, which contradicts the idea that the metric always reflects the quality of the TOA estimate. In fact, at Δθ=π, all of the TOA estimates are very poor. Fortunately, the weight, based on the minimum of all the tone powers, will be very small at Δθ=π, since we have a tone in the middle of the channel, which will exhibit a null at Δθ=π. Let the weight defined in Equation (1) be modified according to the following rule: Reduce the segment weight as the segment variation in TOA increases. The following stepped execution of the rule is preferred, for example, for easy DSP implementation.

If ΔTOA>50 μS, $W_t=W_t/2$;

if ΔTOA>100 μS, $W_t=W_t/4$;

if ΔTOA>150 μS, $W_t=W_t/8$;

if ΔTOA>200 μS, $W_t=W_t/16$;

if ΔTOA>300 μS, $W_t=0$.

It will be appreciated that many other similar executions of the rule are possible in accordance with the present invention.

Figure 12:
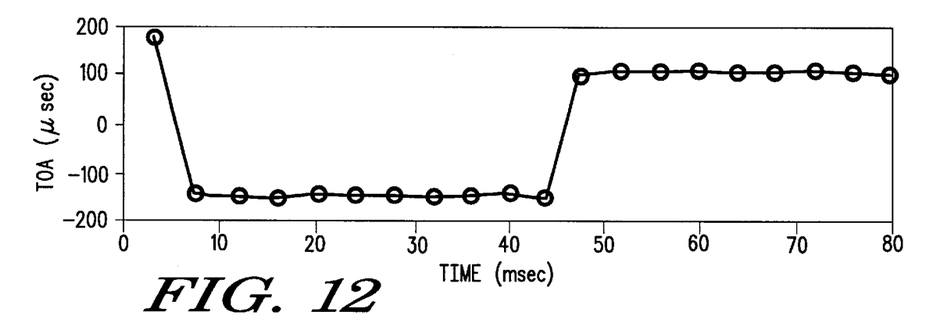
FIG. 12 is an exemplary diagram depicting simulcast performance of a second embodiment of a TOA estimator in accordance with the present invention.
Figure 13:
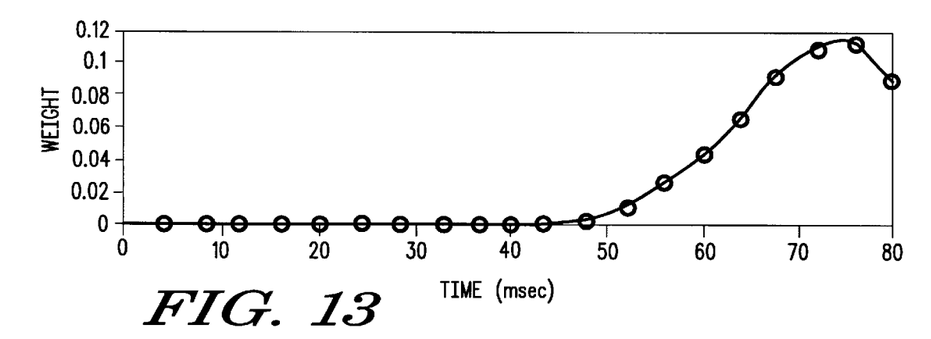
FIG. 13 is an exemplary diagram depicting weights computed by the second embodiment of a TOA estimator in accordance with the present invention.
Figure 14:
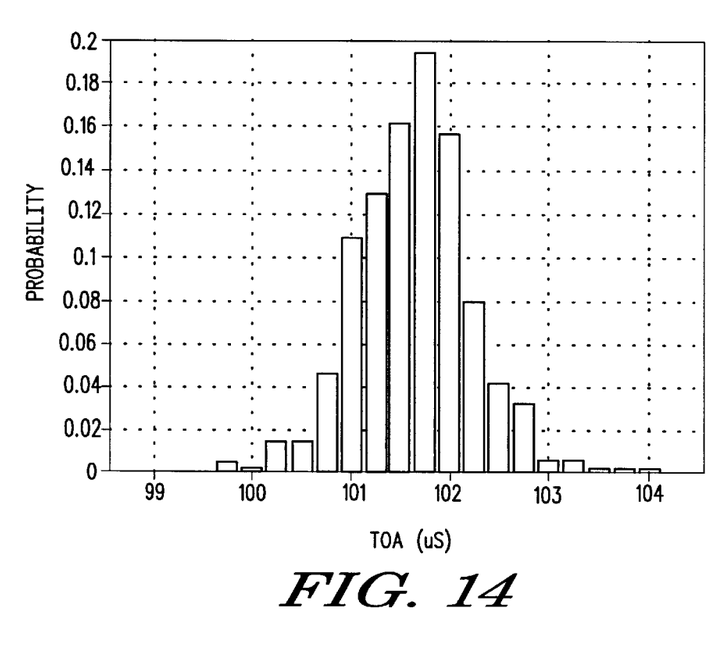
FIG. 14 is an exemplary diagram depicting a TOA probability distribution achieved by the second embodiment of a TOA estimator in accordance with the present invention.

FIG. 12 shows the performance of the modified TOA algorithm of the second embodiment over an 80 msec synchronization signal processing interval. In FIG. 13, we see that the modified weight essentially throws away the bad TOA estimates, and preserves the good ones. FIG. 14 depicts the resulting distribution, which advantageously hits the optimum lock point (101.5625 μsec) with very high reliability.

Figure 15:
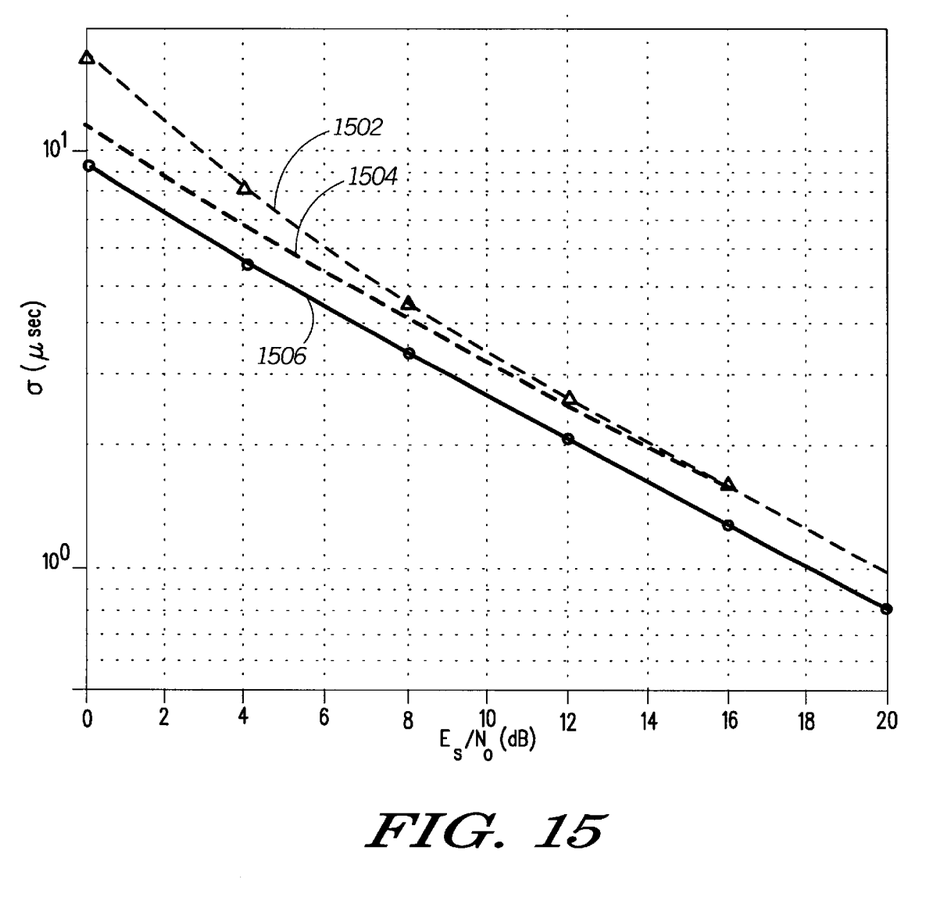
FIG. 15 is an exemplary diagram comparing TOA sensitivity of TOA estimators utilizing two-tone and three-tone techniques.

The modified weight has a slight negative impact on TOA sensitivity at low signal-to-noise ratios, since the ΔTOA metric starts to become large, and some of the time diversity gain is lost as a result. FIG. 15 depicts sensitivity as standard deviation in μsec versus $E_s/N_o$ in dB for the prior-art dual-tone synchronization signal 1506, and, in accordance with the present invention, for the 3-tone synchronization signal with non-modified weight 1504 (first embodiment) and the 3-tone synchronization signal with modified weight 1502 (second embodiment). Note that the 3-tone synchronization signal with modified weight has a slight degradation compared to the 2-tone synchronization signal, but it advantageously achieves the desired TOA estimate in the presence of simulcast delay distortion.

Figure 16:
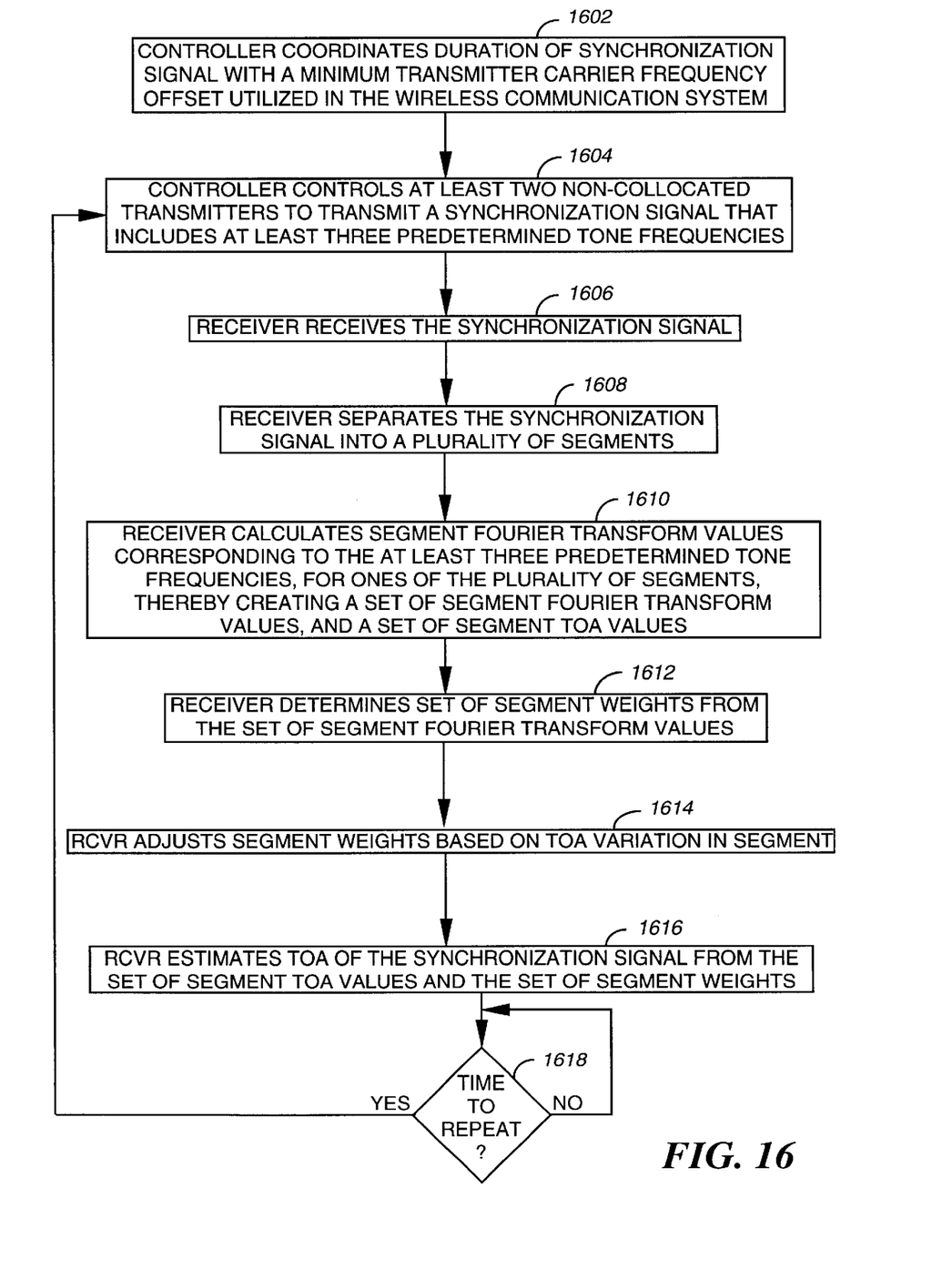
FIG. 16 is an exemplary flow diagram that summarizes the operation of the second embodiment of the wireless communication system of FIG. 1 in accordance with the present invention.

FIG. 16 is an exemplary flow diagram that summarizes the operation of the second embodiment of the wireless communication system of FIG. 1 in accordance with the present invention. First, the controller 112 is programmed to coordinate 1602 the duration of the synchronization signal with the minimum transmitter carrier frequency offset used in the wireless communication system. Alternatively, the sync duration can be defined by the transmission protocol, and the minimum transmitter carrier frequency offset is then determined by the sync duration. The controller 112 then controls 1604 at least two non-collocated transmitters 116 to transmit the synchronization signal for the coordinated duration, the synchronization signal including at least three predetermined tone frequencies, e.g., ±1000 Hz and 0 Hz (at base band). The receiver 122 receives 1606 the synchronization signal, and separates 1608 the synchronization signal into a plurality of segments 404. It will be appreciated that the receiver 122 does not have to wait until the entire synchronization signal has been received to begin the calculations (described below) related to each segment. Rather, segment calculations preferably are performed as soon as each segment is received.

In step 1610, the receiver then calculates segment Fourier transform values corresponding to the at least three predetermined tone frequencies, preferably for each of the plurality of segments, thereby creating a set of segment Fourier transform values. It will be appreciated that, alternatively, segment Fourier transform values can be calculated for selected ones of the plurality of segments, based upon, for example, a signal quality metric, such as received signal strength. After calculating the segment Fourier transform values, the receiver preferably also computes TOA values, as described herein above, the TOA values corresponding to different tone pairs selected from the at least three tones of a segment 404. The receiver 122 then determines weightings for the TOA values according to the frequency differences of the different tone pairs. For example, a tone pair of ±1000

Hz is given a weight of 2, while a tone pair of (1000 Hz, 0 Hz) is given a weight of 1. The receiver 122 then computes a segment TOA value from the TOA values and the corresponding weightings. The segment TOA value can, for example, be computed as a simple linear weighted average of the TOA values corresponding the various tone pairs of the segment. This computation is preferably done for each of the segments 404, thereby generating a set of segment TOA values $$\{\hat{t}_m\}$$

(consisting of a single TOA value per segment 404).

The receiver 122 next determines 1612 a set of segment weights $\{W_{t,m}\}$ from the set of segment Fourier transform values calculated in step 1610. This is preferably done by defining as a segment weight of each segment the minimum magnitude one of the segment Fourier transform values calculated for the segment, raised to a predetermined power, e.g., a power of two. As pointed out herein above, when one of the predetermined tone frequencies is at 0 Hz, the segment weight is advantageously guaranteed to be very low for $\Delta\theta$ values near $\pm\pi$, where the $\Delta$TOA metric is ineffective.

At step 1614 the receiver 122 adjusts segment weights of the set of segment weights based upon the TOA variation in each segment 404. This is preferably accomplished by examining the TOAs of each segment, as computed in step 1610 for each of the tone pairs of the segment. The segment variation in TOA, $\Delta$TOA, is then measured as described herein above. The one of the segment weights corresponding to the segment is then reduced as the segment variation in TOA increases, preferably according to the stepped execution described herein above. When all of the segments of the synchronization signal have been received, and calculations have been performed thereon, the receiver 122 then estimates 1616 the TOA of the synchronization signal from the set of segment TOA values and the set of segment weights. Preferably, this is done as a simple linear weighted average of the set of segment TOA values, using the adjusted segment weights, as described above. Then in step 1618 the receiver 122 checks whether it is time for the next synchronization signal. If not, the receiver 122 continues checking periodically. If so, the flow returns to step 1604.

Thus, it should be clear from the preceding disclosure that the present invention provides a method and apparatus for estimating the time-of-arrival of a synchronization signal in a simulcast environment. Advantageously, the method and apparatus benefits from the utilization of both time diversity and frequency diversity techniques, resulting in a far greater accuracy of TOA estimation than achievable through prior-art techniques.

Many modifications and variations of the present invention are possible in light of the above teachings. For example, while the embodiments describe a synchronization signal utilizing three tone frequencies, more than three tone frequencies can be utilized. In addition, the order in which the computations are performed can be changed when appropriate. Thus, it is to be understood that, within the scope of the appended claims, the invention can be practiced other than as specifically described herein above.

What is claimed is:

1. A method in a wireless communication system for estimating a time-of-arrival (TOA) of a synchronization signal sent simultaneously from at least two non-collocated transmitters, the method comprising, in the at least two non-collocated transmitters, the step of transmitting the synchronization signal such that it includes at least three predetermined tone frequencies;

the method further comprising, in a receiver, the steps of:
receiving the synchronization signal;
separating the synchronization signal into a plurality of segments;
calculating segment Fourier transform values corresponding to the at least three predetermined tone frequencies, for ones of the plurality of segments, thereby creating a set of segment Fourier transform values;
computing a set of segment TOA values corresponding to the set of segment Fourier transform values;
determining a set of segment weights from the set of segment Fourier transform values; and
estimating the TOA of the synchronization signal from the set of segment TOA values and the set of segment weights.

2. The method of claim 1, wherein the determining step comprises the steps of:
defining as a segment weight for a segment, a minimum magnitude one of the segment Fourier transform values calculated for the segment, the minimum magnitude one being raised to a predetermined power.

3. The method of claim 1, wherein the computing step comprises the steps of:
computing TOA values corresponding to different tone pairs of a segment;
determining weightings for the TOA values according to frequency differences of the different tone pairs; and
computing a segment TOA value from the TOA values and the weightings.

4. The method of claim 1, further comprising in the receiver the steps of:
measuring a segment variation in TOA of a segment, as computed from different tone pairs of the segment; and
reducing one of the set of segment weights corresponding to the segment as the segment variation in TOA increases.

5. The method of claim 1, further comprising in the wireless communication system the step of
coordinating a duration of the synchronization signal with a minimum transmitter carrier frequency offset utilized in the wireless communication system.

6. A receiver in a wireless communication system for estimating a time-of-arrival (TOA) of a synchronization signal including at least three predetermined tone frequencies sent simultaneously from at least two non-collocated transmitters, the receiver comprising:
a receiver element for receiving the synchronization signal; and
a processing system coupled to the receiver element for processing the synchronization signal, wherein the processing system is programmed to:
separate the synchronization signal into a plurality of segments;
calculate segment Fourier transform values corresponding to the at least three predetermined tone frequencies, for ones of the plurality of segments, thereby creating a set of segment Fourier transform values;
compute a set of segment TOA values corresponding to the set of segment Fourier transform values;
determine a set of segment weights from the set of segment Fourier transform values; and estimate the TOA of the synchronization signal from the set of segment TOA values and the set of segment weights.

7. The receiver of claim 6, wherein the processing system is further programmed to
define as a segment weight for a segment, a minimum magnitude one of the segment Fourier transform values calculated for the segment, the minimum magnitude one being raised to a predetermined power.

8. The receiver of claim 6, wherein the processing system is further programmed to:
compute TOA values corresponding to different tone pairs of a segment;
determine weightings for the TOA values according to frequency differences of the different tone pairs; and
compute a segment TOA value from the TOA values and the weightings.

9. The receiver of claim 6, wherein the processing system is further programmed to:
measure a segment variation in TOA of a segment, as computed from different tone pairs of the segment; and
reduce one of the set of segment weights corresponding to the segment as the segment variation in TOA increases.

10. A controller in a wireless communication system for facilitating estimation of a time-of-arrival (TOA) of a synchronization signal by a receiver, the controller comprising:
a network interface for receiving a message from a message originator;
a processing system for processing the message; and
a transmitter interface coupled to the processing system for controlling at least two transmitters to transmit the message,
wherein the processing system is programmed to:
control the at least two transmitters to simultaneously transmit, prior to sending the message, the synchronization signal such that it includes at least three predetermined tone frequencies; and
rely upon the receiver to estimate the TOA of the synchronization signal so that the receiver can decode the message.

11. The controller of claim 10, wherein the processing system is further programmed to
coordinate a duration of the synchronization signal with a minimum transmitter carrier frequency offset utilized in the wireless communication system.

* * * * *